United States Patent [19]

Schultz et al.

[11] Patent Number: 4,616,053

[45] Date of Patent: Oct. 7, 1986

[54] HYDROPHOBIC POLYAMIDES

[75] Inventors: Klaus-Dieter Schultz; Rolf-Volker Meyer; Rolf Dhein, all of Krefeld; Heinz-Josef Füllmann, Leverkusen; Dietrich Michael, Krefeld, all of Fed. Rep. of Germany

[73] Assignee: Bayer Aktiengesellschaft, Leverkusen, Fed. Rep. of Germany

[21] Appl. No.: 743,986

[22] Filed: Jun. 12, 1985

[30] Foreign Application Priority Data

Jun. 23, 1984 [DE] Fed. Rep. of Germany ....... 3423291

[51] Int. Cl.⁴ ................................................ C08K 5/17
[52] U.S. Cl. .................................... 524/171; 524/236; 524/244; 524/254; 524/255; 524/324; 524/326; 524/340; 524/351; 524/353; 524/352

[58] Field of Search ............... 524/236, 244, 252, 254, 524/255, 256, 257, 258, 324, 326, 333, 339, 342, 348, 352, 353, 343, 171

[56] References Cited

U.S. PATENT DOCUMENTS

| | | | |
|---|---|---|---|
| 2,278,350 | 3/1942 | Graves | 524/237 |
| 3,418,371 | 12/1968 | Krimm et al. | 524/255 |
| 3,469,690 | 3/1972 | Wheeler | 524/258 |
| 4,426,475 | 1/1984 | Brassat et al. | 524/236 |

FOREIGN PATENT DOCUMENTS 932066 7/1963 United Kingdom .

*Primary Examiner*—Veronica P. Hoke
*Attorney, Agent, or Firm*—Connolly and Hutz

[57] ABSTRACT

Thermoplastical processible polyamides are rendered hydrophobic by addition of particular aromatic amines, optionally in combination with selected phenolic compounds.

9 Claims, No Drawings

HYDROPHOBIC POLYAMIDES

The object of the invention are thermoplastical processible polyamides containing particular aromatic amines, optionally in combination with selected phenolic compounds.

The known high quality property spectrum of thermoplastic polyamides is essentially dependent on the active hydrogen bonds between different carbon amide groups. The hydrophilic nature, conditioned by the polarity of the carbon amide groups, has a substantial influence as it causes a clearly measurable water absorption during storage in water and also in standard operating environments. (c.f. for example Kunststoffhandbuch Vol. VI, Polyamide, Carl-Hanser-Verlag, Munich 1966, P. 458 et seq.)

Thus, for example, the impact strength of mouldings consisting of polyamides is substantially dependent on the water content of the mouldings. In a water-free state, such as after production of the mouldings in particular easily-flowing and therefore easily-processible polyamides the mouldings are relatively sensitive to impact stress. This is particularly the case for mouldings consisting of partially crystalline polyamides.

The impact strength of these mouldings can be markedly improved by conditioning with water. However, parallel to this, there is a plasticizing of the products which can be particularly clearly observed by the dramatic reduction in rigidity, measured by the E-modulus.

However, the mouldings are required to have good rigidity and adequate tenacity for many fields of application, particularly for functional parts and bodywork parts in the automobile industry.

As the water absorption of polyamides is also dependent on the crystalline nature thereof, this can be slightly influenced by crystallisation-promoting additives and by suitable subsequent treatment (for example tempering). However, a decisive change in the level of water absorption cannot be achieved thereby in the case of partially crystalline polyamides, such as PA-6,6.

A series of processes is known for improving the impact strength of polyamides, fresh from injection moulding, without using water. This is achieved, for example, by admixing particular elastomeric polymers. Thus, polyethylene, copolymers of ethylene with polar comonomers, such as vinyl acetate, (meth)acrylic acid (esters) inter alia are proposed as impact strength improving additives or suitable modified rubbers, such as copolymers of butadiene and acrylonitrile.

An improvement in the impact strength of the products is achieved in all these cases. As, however, the polyamide, generally the main component, still tends to have an unchanged water absorption of up to 10%, the inevitable very high water absorption further reduces the rigidity already reduced by the polymeric modifier to such a great extent that the products are completely unsuitable for commercial parts with high demands regarding rigidity, impact strength and dimensional stability.

Substantially less waer is taken up and the corresponding influence on the mechanical properties is less in the case of polyamides consisting of long-chain amide-forming components, that is in the case of products having low concentrations of CONH groups in the polymer chains, but the products have insufficient dimensional stability under heat and rigidity for many uses and are, moreover, expensive because of the high cost of the starting materials.

Thus, there is a need for polyamides which have good dimensional stability under heat, good rigidity, satisfactory impact strength and improved dimensional stability in comparison with PA-6 or PA-6,6 even after conditioning.

It has now surprisingly been found that the water absorption of polyamides, preferably of partially crystalline polyamides, can be reduced and polyamides with the aforementioned combination of properties can be achieved if the polyamides are modified with selective relatively high molecular weight aromatic (poly)amines, optionally in conjunction with selected monophenolic compounds.

The use of a plurality of aromatic amines and diamines as heat stabilisers for polyamides has been repeatedly described. These compounds should be sufficiently active in as low a quantity as 0.5% by weight. Also the use of a plurality of sterically-hindered, preferably o,o'-disubstituted, sterically-hindered phenolic compounds as heat stabilisers for polyamides has also been repeatedly proposed, quantities of 0.5% by weight also being sufficiently active in this case. There is no indication that particular (poly)amines in higher concentrations, optionally in combination with suitable phenols, produce a reduction in water absorption and thus make possible a greater rigidity.

Thus, one object of the present invention are thermoplastic, optionally reinforced polyamide compositions, which are characterised in that they contain (1) from 1.5 to 10% by weight, preferably from 2 to 8% by weight, based on the polyamide, of at least one aromatic amine corresponding to the general formula I or II,

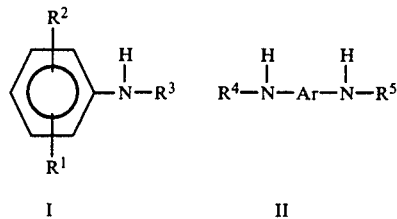

and optionally (2) up to 8% by weight, based on the polyamide, preferably up to 5% by weight, of a monophenolic compound corresponding to the general formula III

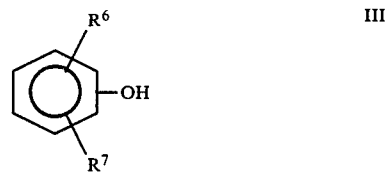

wherein
the radicals $R^1$ to $R^7$ and Ar are defined in the following, the sum of components (1) and (2) always amounting to at most 10% by weight, preferably at most 8% by weight, based on the polyamide.

The aromatic amines corresponding to the general formula I contain at least 10, preferably from 10 to 36 carbon atoms, more preferably from 10 to 24 carbon atoms and in the general formula I

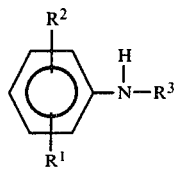

$R^1$ and $R^2$ independently represent a hydrogen atom, a $C_1$–$C_{24}$, preferably $C_4$–$C_{18}$ alkyl radical, a $C_6$–$C_{18}$, preferably $C_6$–$C_{12}$ aryl radical, or a $C_7$–$C_{20}$, preferably $C_7$–$C_{15}$ aralkyl radical, whereby each of the radicals may be substituted by at least one $C_1$–$C_{12}$, preferably $C_1$–$C_8$ alkyl group or a halogen atom (preferably Cl or Br) and the aryl radicals may be bound via —O—, $C_1$–$C_3$ alkylene or —SO$_2$ bridging members, or $R^1$ and $R^2$ together represent members of an aromatic or cycloaliphatic ring having $C_5$–$C_{12}$ and $R^3$ represents a hydrogen atom or a $C_1$–$C_{24}$, preferably $C_1$–$C_{18}$ alkyl radical, $C_6$–$C_{10}$, preferably C aryl radical, $C_7$–$C_{15}$, preferably $C_7$–$C_{12}$ aralkyl radical or $C_7$–$C_{15}$, preferably $C_7$–$C_{12}$ alkaryl radical.

Relatively high molecular weight or long-chain primary or secondary aromaic amines having $C_{10}$–$C_{20}$, such as aromatic amines substituted one or more times with a $C_1$–$C_{12}$ alkyl radical and/or $C_7$–$C_{15}$ aralkyl radical or amino-di- or triphenyls optionally substituted with at least one $C_1$–$C_6$ alkyl group, the rings of which can optionally be bound via —O—, $C_1$–$C_3$ alkylene or —SO$_2$— bridging members, are preferred.

The aromatic polyamines corresponding to the general formula II contain at most 40 carbon atoms, preferably at most 30 carbon atoms.

In the general formula II

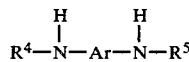

Ar represents a phenylene radical or naphthylene radical substituted by $R^4$ and $R^5$ or a $C_{12}$–$C_{36}$-, preferably $C_{12}$–$C_{20}$ diarylene radical which is optionally substituted one or more times with a $C_1$–$C_4$ alkyl group and is bound directly or via —O—, $C_1$–$C_3$ alkylene or —SO$_2$ bridging members, and $R^4$ and $R^5$ are the same or different, and represent a hydrogen atom or a $C_1$–$C_{24}$, preferably $C_1$–$C_{18}$ alkyl radical.

The amines can also be used in combination with sterically unhindered monophenolic compounds having at least 10 carbon atoms, which may be substituted at most in one o-position to the phenolic OH-group and corresponding to the general formula III

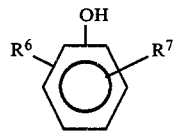

wherein $R^6$ and $R^7$, independently represent a hydrogen atom, a $C_1$–$C_{16}$-, preferably $C_4$–$C_{12}$ alkyl radical, a $C_6$–$C_{18}$-, preferably $C_6$–$C_{12}$ aryl radical or a $C_7$–$C_{20}$-, preferably $C_7$–$C_{15}$-aralkyl radical, each of the radicals may be substituted by at least one $C_1$–$C_{12}$ alkyl group or a halogen atom (preferably Cl or Br) and the aryl radicals may be bound via —O—, $C_1$–$C_3$ alkylene or —SO$_2$ bridging members, or $R^6$ and $R^7$ represent members of an aromatic or cycloaliphatic ring having $C_5$–$C_{12}$. Monophenolic compounds which are substituted one or more times with $C_1$–$C_{22}$, which may be substituted at most in one o-position to the OH group, or monohydroxy di- or triphenyl which are optionally substituted by at least one $C_1$–$C_6$ alkyl group, the rings of which are optionally bound via —O—, $C_1$–$C_3$ alkylene or —SO$_2$ bridging members and which may at most be substituted in one o-position to the OH group.

The following are examples of aromatic amines, diamines and phenols:

(a) Aromatic Monoamines

Tetrahydronaphthylamines, 2-butyl-aniline (secondary and tertiary), 4-tert.-butyl-aniline, 4-tert.-pentyl-aniline, octylaniline (mixtures), nonylaniline (mixtures) dodecylaniline (mixtures), 4-aminodiphenyl, 2-aminodiphenyl, alkyl group-substituted aminodiphenyl, 1-aminonaphthalene, 2-aminonaphthalene, benzylaniline(s), benzyltoluidine(s), 2-phenyl-2-(4-aminophenyl)propane, 4-aminodiphenyl sulphone, 4-aminodiphenyl ether, 2- or 4-cyclohexylanilines, N,N-diphenylamine, N-benzylaniline or mixtures of the above compounds.

(b) Aromatic Diamines

Bis-(4-amino-phenyl)-methane, 3-methylbenzidine, 2,2-bis(4-aminophenyl)-propane, 1,1-bis(4-aminophenyl)-cyclohexane, 1,2-diaminobenzene, 1,4-diaminobenzene, 1,4-diamononaphthalene, 1,5-diaminonaphthalene, 1,3-diaminotoluene(s), N,N'-dimethyl-4,4'-biphenyldiamine, bis-(4-methylaminophenyl)-methane, 2,2-bis-(4-methyl-aminophenyl)propane or mixtures of the above compounds.

(c) Phenolic Compounds

Tetrahydronaphthol, 2-butyl-phenol (secondary and tertiary), 4-t-butylphenol, thymol, 4-tert.-pentylphenol, octylphenol (mixtures), nonylphenol (mixtures), dodecyl-phenol (mixtures), 4-hydroxydiphenyl, 2-hydroxydiphenyl, alkyl group-substituted hydroxydiphenyls, as described, for example, in DOS No. 19 43230, 1-naphthol, 2-naphthol, benzylphenol(s), benzyl-cresol(s), 2-phenyl-2-(4-hydroxyphenyl)propane, 4-hydroxydiphenyl sulphone, 4-hydroxydiphenyl ether, 2- or 4-cyclohexylphenols or mixtures of the above compounds.

The following are particularly advantageous: Nonylaniline, dodecylaniline, 2-amino-biphenyl, 4-aminodiphenyl ether, 2- and 4-cyclohexylaniline, N,N-diphenylamine and N-benzylaniline, optionally in combination with alkyl group-substituted hydroxydiphenyls, nonylphenol, dodecylphenol, 2-hydroxybiphenyl and 2-phenyl-2-(4-hydroxyphenyl)-propane.

The amine is incorporated in a quantity of from 1.5 to 10, more preferably from 2 to 8% by weight, based on polyamide, optionally in combination with phenols corresponding to the general formula III, the quantity of phenol being up to 8% by weight, preferably up to 5% by weight, based on polyamide, and the sum of the two components being at most 10% by weight, preferably at most 8% by weight, based on the polyamide.

Linear polycondensates consisting of lactams having at least 5 ring members, such as ε-caprolactam or laurinlactam, or of suitable ω-aminocarboxylic acids, or of diamines and dicarboxylic acids, such as 6,6-, 6,7-, 6,8-, 6,9-, 6,10-, 6,12-, 8,8-, 12,12-polyamide, or polycondensates from aromatic dicarboxylic acids, such as isophthalic acid, terephthalic acid with diamines, such as hexamethylene diamines, octamethylene diamine, from araliphatic starting materials, such as m- or p-xylylene diamines and adipic acid, suberic acid, sebacic acid, polycondensates based on alicyclic starting materials, such as cyclohexane diacetic acid, diaminodicyclohexylmethanes, isophorone diamine, can be used as polyamides.

Partially crystalline polyamides, most preferably PA-6 and PA-6,6 are preferably used.

Polymer blends substantially consisting of preferably at least 60% by weight of polyamide and known elastifying polymers, such as polyolefins, olefinic copolymers, preferably those containing proportions of incorporated polar groups or suitable graft (co)-polymers can also be used instead of polyamides.

The polyamide components and the modifiers can be mixed together above the melting point of the polyamide to produce the modified polyamides according to the invention. This can, for example, be effected directly after production of the polyamide by mixing the modifier with the melt spinning off as a strand. The modified polyamides according to the invention are preferably produced by mixing the starting components in conventional endless screw apparatus. The components can be mixed before they are metered in together and can also be supplied separately to the extruder from two metering units. Parallel addition is advantageous in the case of liquid additives.

This process is selected in particular if further polymers are used in addition to polyamides for the production of suitably modified polymer blends or if other additives, such as stabilisers, mould release agents, lubricants, crystallisation-accelerators, plasticizers, pigments, dyes, reinforcers and/or fillers, such as glass fibres or asbestos are worked in.

Conventional known apparatus are suitable for compounding. Double screw extruders are preferably used.

The polyamide moulding compositions according to the invention, which otherwise have an essentially constant property form, are distinguished from the unmodified polyamides, by a substantially improved dimensional stability and a greater rigidity. The polyamide moulding compositions are particularly suitable for the production of glass fibre-reinforced or filler-admixed mouldings, as the reinforcing and hardening effect of the additives, preferably added in a quantity of from 10 to 60% by weight, is compensated to a far lesser extent by the water absorption than was hitherto the case. These glass fibre-reinforced products are distinguished by improved elongation at tear and improved impact strength.

The new polyamide moulding compositions are particularly suitable for the production of mouldings by the injection moulding process and preferably for uses where the combination of good rigidity, good dimensional stability under heat and satisfactory impact strength is demanded. The glass fibre-reinforced products are preferably suitable for mouldings in the automobile industry, such as cooling chambes or oil sumps and for underwater uses.

EXAMPLE 1

95% by weight of a 6-polyamide having a relative viscosity of 3.1, measured in a 1% solution in m-cresol at 25° C. and 5% by weight of p-cyclohexylaniline are mixed using a drum mixing apparatus and are passed via a metering scale into a two-shaft extruder of the ZSK53 type and extruded at 260° C. at 90 rpm. The homogeneous melt is spun off as a strand in a water bath, granulated and dried at a temperature of from 80° to 100° C. until it has a water content of <0.1%. The product has a relative viscosity of 2.9.

Mouldings produced from the product are stored over relatively long periods, together with unmodified comparative samples, in a standard operating environment and in water. The polyamide which has been modified according to the invention takes up substantially less water under all conditions. Measuring values, are given in Table 1.

Unreinforced products are individually conditioned to have a water content of 2.5% by weight, and reinforced products one of 1.5% by weight by storage in water to determine the E-moduli after water absorption, together with the non-inventive comparison experiments (W1 and W2).

EXAMPLE 2 TO 8

Analogously to Example 1, various hydrophobizing additives are worked into different polyamides and the resulting products are examined as described in Example 1. The composition of the modified polyamides and the properties thereof are given in Table 1 together with two non-inventive comparison experiments (VV1 and VV2).

EXAMPLES 9 TO 11

Glass fibre-reinforced polyamides are produced analogously to Example 1 and the resulting products are processed to produce mouldings. The composition of the modified glass fibre-reinforced polyamides and properties thereof are summarised in Table 2, together with two not inventive comparison experiments (VV3 and VV4).

TABLE 1

| | | | | Properties of the products | | | | |
| | | Starting components | | | Water absorption (% by weight) | | | | |
| Ex. | PA-type ($\eta_{rel}$) | Quantity (% by weight) | Additive (% by weight) | $\eta_{rel}$ | in a standard operating environment after 66 days | stored in water (23° C.) after 40 days | E-modulus (MPa) H$_2$O absorption. | (MPa) H$_2$O abs. (2.5%) | $\eta_{rel.}$ change$^x$ modulii (%) |
|---|---|---|---|---|---|---|---|---|---|
| 1 | PA-6 (3.1) | 95 | 5-p-cyclohexylaniline | 2.9 | 0.86 | 3.78 | 3120 | 1650 | 127 |
| 2 | PA-6 (3.1) | 97 | 3-p-cyclohexylaniline | 2.9 | 0.95 | 4.28 | 3160 | 1520 | 117 |
| 3 | PA-6 (3.1) | 95 | 5 p-dodecylaniline | 2.9 | 0.91 | 4.02 | 3050 | 1600 | 123 |
| 4 | PA-6 (3.1) | 95 | 5-bis-(4-aminophenyl)- | 2.9 | 0.89 | 3.88 | 3300 | 1620 | 125 |
| 5 | PA-6 | 94 | 4 N,N—diphenylamine + | 2.9 | 0.83 | 3.72 | 3100 | 1660 | 128 |

TABLE 1-continued

| | Starting components | | | | Properties of the products Water absorption (% by weight) | | E-modulus (MPa) | | $\eta_{rel.}$ |
|---|---|---|---|---|---|---|---|---|---|
| Ex. | PA-type ($\eta_{rel}$) | Quantity (% by weight) | Additive (% by weight) | $\eta_{rel}$ | in a standard operating environment after 66 days | stored in water (23° C.) after 40 days | $H_2O$ absorption. | $H_2O$ abs. (2.5%) | change$^x$ modulii (%) |
| 6 | PA-6 (3.1) | 90 | 2 2-hydroxydiphenyl 4 N,N—diphenylamine + 6 2-hydroxydiphenyl | 2.8 | 0.79 | 3.62 | 2940 | 1480 | 114 |
| 7 | PA-6 (3.1) | 94 | 2 N—benzylaniline + 4 tolylcresol (isomer mixture.) | 2.9 | 0.82 | 3.71 | 3100 | 1640 | 126 |
| 8 | PA-6,6 (2.7) | 95 | 5 p-cyclohexylaniline | 2.6 | 0.61 | 2.10 | 3400 | 1920 | 120 |
| VV 1 | PA-6 | 100 | — | 3.1 | 1.12 | 5.22 | 3220 | 1300 | 100 |
| VV 2 | PA-6,6 | 100 | — | 2.7 | 0.78 | 2.96 | 3400 | 1600 | 100 |

$^x$(poly)amine-free polyamide = 100%

TABLE 2

| | Starting components | | | | Properties of the products Water absorption (% by weight) | | E-modulus (MPa) | | $\eta_{rel.}$ |
|---|---|---|---|---|---|---|---|---|---|
| Ex | PA-type ($\eta_{rel}$) | Quantity (% by weight) | Glass Fibre (% by weight) | Additive (% by weight) | in a standard operating environment after 66 days. | stored in water 24 h/60° | $H_2O$ absorption. | $H_2O$ abs. (1.5%) | change$^x$ of E-moduli |
| 9 | PA-6 (3.1) | 65 | 30 | 5-p-cyclohexyl aniline | 0.43 | 3.3 | 8950 | 5030 | 122 |
| VV 3 | PA-6 (3.1) | 70 | 30 | — | 0.60 | 4.7 | 9100 | 4110 | 100 |
| 10 | PA-6,6 (2.8) | 65 | 30 | 5 p-cyclohexyl-aniline | 0.39 | 1.2 | 9280 | 6230 | 123 |
| VV 4 | PA-6,6 (2.8) | 70 | 30 | — | 0.51 | 1.7 | 9450 | 5080 | 100 |
| 11 | PA-6,6 (2.8) | 65 | 30 | 5 bis-(4-amino-phenyl)-methane | 0.40 | 1.3 | 9480 | 6320 | 124 |

$^x$(poly)amine-free polyamide = 100%

We claim:

1. Thermoplastic polyamide moulding compositions, which contain
   (a) from 1.5 to 8% by weight, based on the polyamide, of at least one aromatic amine corresponding to the formulae

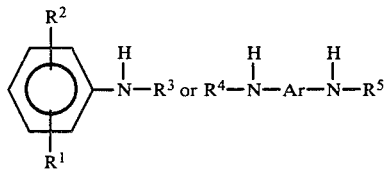

wherein
$R^1$ and $R^2$ independently represent a hydrogen atom, a $C_1$–$C_{24}$ alkyl radical, a substituted $C_1$–$C_{24}$ alkyl radical, a $C_6$–$C_{18}$ aryl radical, a substituted $C_6$–$C_{18}$ aryl radical, a $C_7$–$C_{20}$ aralkyl radical or a substituted $C_7$–$C_{20}$ aralkyl radical wherein each of the substituted radicals is substituted by at least one $C_1$–$C_{12}$ alkyl group or a halogen atom and the aryl radicals may be bound to the aromatic amine by a direct bond, —O—, $C_1$–$C_3$ alkylene or —$SO_2$— bridging members, or $R^1$ and $R^2$ together represents an aromatic or cycloaliphatic ring having $C_5$–$C_{12}$,
$R^3$ represents a hydrogen atom or $C_1$–$C_{24}$ alkyl radical, $C_6$–$C_{10}$ aryl radical, or $C_7$–$C_{15}$ aralkyl radical, Ar represents a phenylene radical or naphthalene radical unsubstituted or substituted by $R^4$ and $R^5$ or Ar is a $C_{12}$–$C_{36}$ diarylene radical which is unsubstituted or substituted with at least one $C_1$–$C_4$ alkyl group and is Ar directly bound to the nitrogen or bound to the nitrogens via —O—, $C_1$–$C_3$ alkylene or —$SO_2$ bridging members, and
$R^4$ and $R^5$ are the same or different and each represents a hydrogen atom or a $C_1$–$C_{24}$ alkyl radical, and
(b) 2 to 8% by weight, based on the polyamide, of a mono phenolic compound having at least 10 carbon atoms, which has at most one substitution in the o-position of the phenolic OH group and corresponds to the formula

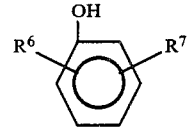

wherein
$R^6$ and $R^7$ independently represent a hydrogen atom, a $C_1$–$C_{16}$ alkyl radical, a substituted $C_1$–$C_{16}$ alkyl radical, a $C_6$–$C_{18}$ aryl radical, a substituted $C_6$–$C_{18}$ aryl radical, a $C_7$–$C_{20}$ aralkyl radical or a substituted $C_7$–$C_{20}$ aralkyl radical, wherein each of the substituted radicals is substituted by at least one $C_1$–$C_{12}$ alkyl group or a halogen atom and the aryl radicals may be bound to the phenolic ring via a direct bond, —O—, $C_1$–$C_3$ alkylene or —$SO_2$ bridging members, or $R^6$ and $R^7$ together represent an aromatic or cycloaliphatic ring having $C_5$–$C_{12}$, with the proviso that the sum of components (a) and (b) always amounts to at most 10% by weight, based on the polyamide.

2. Polyamide moulding compositions as claimed in claim 1 wherein the aromatic amine (a) contains 10 to 40 carbon atoms.

3. Polyamide moulding compositions as claimed in claim 1 wherein the sum of the components (a) and (b) is at most 8% by weight, based on the polyamide.

4. Polyamide moulding compositions as claimed in claim 1 wherein $R^1$ and $R^2$ independently represent a hydrogen atom, a $C_4$–$C_{18}$ alkyl radical, a substituted $C_4$–$C_{18}$ alkyl radical, a $C_6$–$C_{12}$ aryl radical, a substituted $C_6$–$C_{12}$ aryl radical, a $C_7$–$C_{15}$ aralkyl radical or a substituted $C_7$–$C_{15}$ radical wherein each of the substituted radicals is substituted by at least one $C_1$–$C_8$ alkyl group or a halogen atom, and the aryl radical is bound to the aromatic amine by a direct bond, —O—, $C_1$–$C_3$ alkylene or —$SO_2$ bridging members, or $R^1$ and $R^2$ together represent an aromatic or cycloaliphatic ring having $C_5$–$C_{12}$, and $R^3$ represents a hydrogen atom or a $C_1$–$C_{18}$ alkyl radical, a phenyl radical, a $C_7$–$C_{12}$ aralkyl radical or a $C_7$–$C_{12}$ alkaryl radical;

Ar represents a phenylene or naphthalene radical substituted by $R^4$ and $R^5$ or Ar is a $C_{12}$–$C_{20}$ diarylene radical which is unsubstituted or substituted by at least one $C_1$–$C_4$ alkyl group and Ar is bound to the nitrogens directly or via —O—, $C_1$–$C_3$ alkylene or —$SO_2$ bridging members, $R^4$ and $R^5$ are the same or different, and each represents a hydrogen atom or a $C_1$–$C_{18}$ alkyl radical; and $R^6$ and $R^7$, independently each represent a hydrogen atom, a $C_4$–$C_{12}$ alkyl radical, a substituted $C_4$–$C_{12}$ alkyl radical, $C_6$–$C_{12}$ aryl radical, a substituted $C_6$–$C_{12}$ aryl radical, a $C_7$–$C_{15}$ aralkyl radical, or a substituted $C_7$–$C_{15}$ aralkyl radical, wherein each of the substituted radicals is substituted by at least one $C_1$–$C_{12}$ alkyl group or a halogen atom, and the aryl radicals are bound to the phenolic ring by a direct bond, —O—, $C_1$–$C_3$ alkylene or —$SO_2$ bridging members, or $R^6$ and $R^7$ together represent an aromatic or cycloaliphatic ring having $C_5$–$C_{12}$.

5. Polyamide moulding compositions as claimed in claim 1 wherein the amines (a) are amino-di- or triphenyls unsubstituted or substituted with at least one $C_1$–$C_6$ alkyl group and the monophenolic compounds are mono hydroxy di- or triphenyl which are unsubstituted or substituted by at least one $C_1$–$C_6$ alkyl group and which are at most substituted in one o-position to the OH group.

6. Polyamide moulding compositions as claimed in claim 1 wherein the amine (a) is at least one of nonylaniline, dodecylaniline, 2-amino-biphenyl, 4-aminodiphenyl ether, 2- and 4-cyclohexylaniline, N,N-diphenylamine, N-benzylaniline, or mixtures thereof.

7. Polyamide moulding compositions as claimed in claim 1 wherein the polyamide is polyamide-6 or polyamide-6,6.

8. Polyamide moulding compositions as claimed in claim 1 wherein the phenolic component (b) is alkyl group-substituted hydroxydiphenyls, nonylphenol, dodecylphenol, 2-hydroxybiphenyl and 2-phenyl-2-(4-hydroxyphenyl)-propane.

9. Polyamide moulding compositions as claimed in claim 1 wherein as amines at least one member of the groups tetrahydronaphthylamines, 2-butyl-aniline (secondary and tertiary), 4-tert.-butyl-aniline, 4-tert.-pentylaniline, octylaniline (mixtures), nonylaniline (mixtures), dodecylaniline (mixtures), 4-aminodiphenyl, 2-aminodiphenyl, alkyl group-substituted aminodiphenyl, 1-aminonaphthalene, 2-aminonaphthalene, benzylaniline(s), benzyltoluidine(s), 2-phenyl-2-(4-aminophenyl)propane, 4-aminodiphenyl sulphone, 4-aminodiphenyl ether, 2- or 4-cyclohexylanilines, N,N-diphenylamine, N-benzylaniline or mixtures of the above compounds, Bis-(4-amino-phenyl)methane, 3-methylbenzidine, 2,2-bis-(4-aminophenyl)-propane, 1,1-bis(4-aminophenyl)-cyclohexane, 1,2-diaminobenzene, 1,4-diaminobenzene, 1,4-diaminonaphthalene, 1,5-diaminonaphthalene, 1,3-diaminotoluene(s), N,N'-dimethyl-4,4'-biphenyldiamine, bis-(4-methylaminophenyl)-methane, 2,2-bis-(4-methyl-aminophenyl)-propane and mixtures of the above compounds and as phenolic compound at least one member of the groups tetrahydronaphthol, 2-butyl-phenol (secondary and tertiary), 4-t-butylphenol, thymol, 4-tert.-pentylphenol, octylphenol (mixtures), nonylphenol (mixtures), dodecyl-phenol (mixtures), 4-hydroxydiphenyl, 2-hydroxydiphenyl, alkyl group-substituted hydroxydiphenyls, 1-naphthol, benzylphenol(s), benzyl-cresol(s), 2-phenyl-2-(4-hydroxyphenyl)-propane, 4-hydroxydiphenyl sulphone, 4-hydroxydiphenyl ether, 2- or 4-cyclohexylphenols and mixtures of the above compounds is used.

* * * * *